(12) United States Patent
Chatterjee et al.

(10) Patent No.: US 11,315,008 B2
(45) Date of Patent: Apr. 26, 2022

(54) METHOD AND SYSTEM FOR PROVIDING EXPLANATION OF PREDICTION GENERATED BY AN ARTIFICIAL NEURAL NETWORK MODEL

(71) Applicant: Wipro Limited, Bangalore (IN)

(72) Inventors: Arindam Chatterjee, Gondalpara (IN); Tapati Bandop Adhyay, Bengaluru (IN)

(73) Assignee: Wipro Limited, Bangalore (IN)

( * ) Notice: Subject to any disclaimer, the term of this patent is extended or adjusted under 35 U.S.C. 154(b) by 596 days.

(21) Appl. No.: 16/281,904

(22) Filed: Feb. 21, 2019

(65) Prior Publication Data
US 2020/0210817 A1    Jul. 2, 2020

(30) Foreign Application Priority Data
Dec. 31, 2018   (IN) .............................. 201841049976

(51) Int. Cl.
*G06N 3/08* (2006.01)
*G06N 5/04* (2006.01)
*G06N 3/04* (2006.01)

(52) U.S. Cl.
CPC ............. *G06N 3/0481* (2013.01); *G06N 3/08* (2013.01); *G06N 5/045* (2013.01)

(58) Field of Classification Search
CPC ......... G06N 3/0454; G06N 3/08; G06N 5/045
See application file for complete search history.

(56) References Cited

U.S. PATENT DOCUMENTS

| 8,566,321 B2 | 10/2013 | Majumdar |
| 2007/0067285 A1 | 3/2007 | Blume et al. |
| 2014/0379520 A1* | 12/2014 | Nemery ............ G06Q 30/0631 705/26.7 |
| 2018/0322406 A1* | 11/2018 | Merrill ................... G06N 20/20 |

(Continued)

OTHER PUBLICATIONS

Alvarez-Melis, David, and Tommi S. Jaakkola. "A causal framework for explaining the predictions of black-box sequence-to-sequence models." arXiv preprint arXiv:1707.01943 (2017). (Year: 2017).*

(Continued)

*Primary Examiner* — Hal Schnee
(74) *Attorney, Agent, or Firm* — Finnegan, Henderson, Farabow, Garrett & Dunner, LLP

(57) ABSTRACT

This disclosure relates to method and system for providing an explanation for a prediction generated by an artificial neural network (ANN) model for a given input data. The method may include receiving the given input data and the prediction generated by the ANN model. The ANN model may be built and trained for a target application. The method may further include determining a plurality of relevant portions of the given input data. For each of the plurality of relevant portions, the method may further include fetching a portional prediction and a portional prediction score generated by the ANN model, and determining a degree of influence score based on the portional prediction score and a comparison between the portional prediction and the prediction. The method may further include providing the explanation for the prediction based on the degree of influence score of each of the plurality of relevant portions.

20 Claims, 8 Drawing Sheets

(56) References Cited

U.S. PATENT DOCUMENTS

2019/0221311 A1\* 7/2019 Takeuchi ............... G16H 50/50
2019/0354805 A1\* 11/2019 Hind ...................... G06N 20/20

OTHER PUBLICATIONS

François Bachoc, Fabrice Gamboa, Jean-Michel Loubes, Laurent Risser. Entropic Variable Boosting for Explainability & Interpretability in Machine Learning. 2018. ffhal-01897642 (Year: 2018).\*
Robnik-Šikonja, Marko, and Marko Bohanec. "Perturbation-based explanations of prediction models." Human and machine learning. Springer, Cham, 2018. 159-175. (Year: 2018).\*

\* cited by examiner

METHOD AND SYSTEM FOR PROVIDING EXPLANATION OF PREDICTION GENERATED BY AN ARTIFICIAL NEURAL NETWORK MODEL

TECHNICAL FIELD

This disclosure relates generally to artificial neural network (ANN), and more particularly to method and system for providing an explanation for a prediction generated by an ANN model.

BACKGROUND

Artificial Intelligence (AI) models, such as artificial neural network (ANN) models, have been gaining immense popularity in recent times. Various autonomous systems based on AI have been developed which are able to perceive, learn, decide, and act on their own with little or no human assistance. These AI based systems or AI systems are highly capable and versatile, and hence capable of performing different types of complex tasks.

However, the acceptance and utilization of AI systems are limited, as the AI systems are generally unable to explain the reasoning behind their output (e.g., predictions) to human users. Because of this black box nature of the AI systems, a large number of AI systems, that are being developed, are not being adopted. The problem is even more pronounced in case of natural language processing (NLP) or natural language understanding (NLU), because of complicated nature of language. Explaining the prediction made by the AI systems built for NLP or NLU applications, therefore, becomes a highly complex task. Moreover, the AI systems built for NLU applications may require large amount of data for learning. This adds to the complexity as it is difficult to determine which data has been relied upon by the AI systems in order to make predictions. Due to these complexities, system architects and designers are unable to understand the behavior of the AI systems. As it will be appreciated, an explanation for a prediction made by any given AI system may allow a better understanding of the working of that AI system, and may further enable retuning, rectifying, or otherwise improving the AI system. As such, training data and algorithmic parameters for the AI system may be adjusted and modified so as to build an improved and more effective AI system.

SUMMARY

In one embodiment, a method for providing an explanation for a prediction generated by an artificial neural network (ANN) model for a given input data, is disclosed. In one example, the method may include receiving the given input data and the prediction generated by the ANN model. The ANN model may be built and trained for a target application. The method may further include determining a plurality of relevant portions of the given input data. For each of the plurality of relevant portions, the method may further include fetching a portional prediction and a portional prediction score generated by the ANN model, and determining a degree of influence score based on the portional prediction score and a comparison between the portional prediction and the prediction. The method may further include providing the explanation for the prediction based on the degree of influence score of each of the plurality of relevant portions.

In one embodiment, a system for providing an explanation for a prediction generated by an ANN model for a given input data, is disclosed. In one example, the system may include a prediction explanation device, which may include at least one processor and a computer-readable medium coupled to the processor. The computer-readable medium may store processor executable instructions, which when executed may cause the at least one processor to receive the given input data and the prediction generated by the ANN model. The ANN model may be built and trained for a target application. The processor executable instructions, on execution, may further cause the at least one processor to determine a plurality of relevant portions of the given input data. For each of the plurality of relevant portions, the processor executable instructions, on execution, may further cause the at least one processor to fetch a portional prediction and a portional prediction score generated by the ANN model, and to determine a degree of influence score based on the portional prediction score and a comparison between the portional prediction and the prediction. The processor executable instructions, on execution, may further cause the at least one processor to provide the explanation for the prediction based on the degree of influence score of each of the plurality of relevant portions.

In one embodiment, a non-transitory computer-readable medium storing computer-executable instructions for providing an explanation for a prediction generated by an ANN model for a given input data, is disclosed. In one example, the stored instructions, when executed by a processor, may cause the processor to perform operations including receiving the given input data and the prediction generated by the ANN model. The ANN model may be built and trained for a target application. The operations may further include determining a plurality of relevant portions of the given input data. For each of the plurality of relevant portions, the operations may further include fetching a portional prediction and a portional prediction score generated by the ANN model, and determining a degree of influence score based on the portional prediction score and a comparison between the portional prediction and the prediction. The operations may further include providing the explanation for the prediction based on the degree of influence score of each of the plurality of relevant portions.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
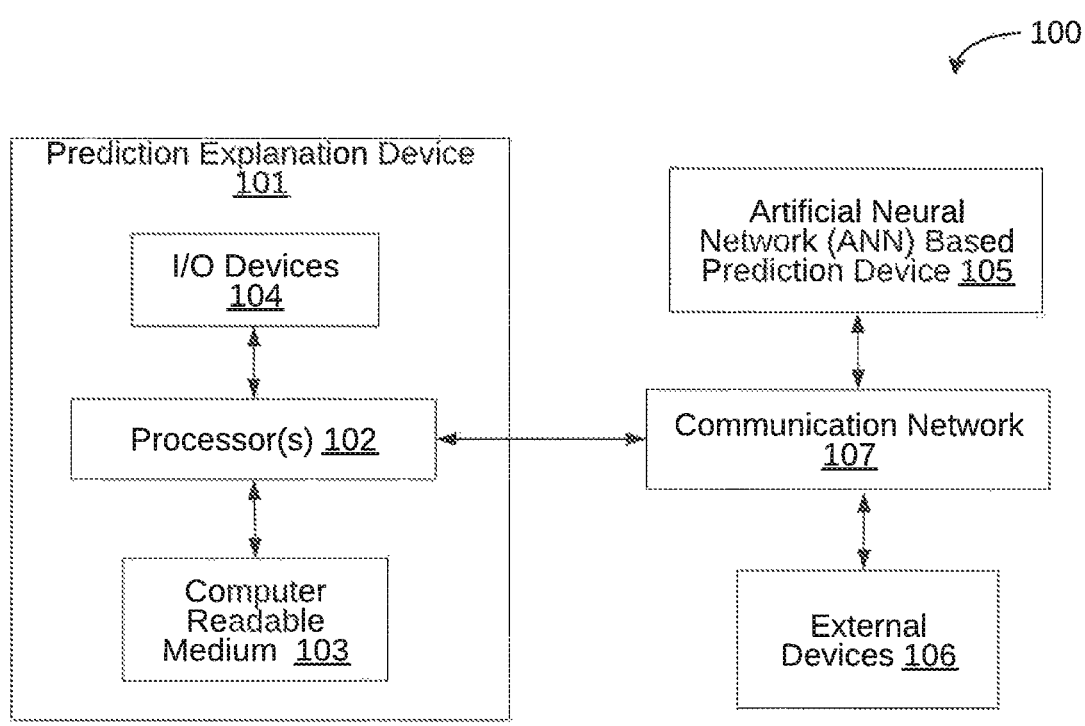
FIG. 1 is a block diagram of an exemplary system for providing an explanation for an output (e.g., a prediction) generated by an artificial neural network (ANN) based prediction device, in accordance with some embodiments of the present disclosure.

Referring now to FIG. 1, an exemplary system 100 for providing an explanation for an output (e.g., a prediction) generated by an artificial neural network (ANN) based prediction device 105 is illustrated, in accordance with some embodiments of the present disclosure. In particular, the system 100 may include a prediction explanation device 101 for providing an explanation for a prediction generated by the ANN based prediction device 105 for a given input data. The ANN based prediction device 105 may implement an ANN model (also referred to as prediction model or ANN prediction model) so as to generate output (i.e., predictions) for the given input data. The ANN model may be built and trained for a target application including, but not limited to, natural language processing (NLP) application, natural language understanding (NLU) application, image processing application, and video processing application. As discussed above, the ANN model may not provide an explanation or rational for the output (e.g., predictions) generated by it. The prediction explanation device 101 may provide the explanation for the prediction generated by the ANN model and, therefore, help the user to understand behavior and working of the ANN model.

As will be described in greater detail in conjunction with FIGS. 2-7, the prediction explanation device 101 may receive the given input data and the prediction generated by the ANN model 105 for the given input data. In some embodiments, the prediction explanation device 101 may determine a plurality of relevant portions of the given input data. Further, for each of the plurality of relevant portions, the prediction explanation device 101 may fetch a portional prediction and a portional prediction score generated by the ANN model, and may determine a degree of influence score based on the portional prediction score and a comparison between the portional prediction and the prediction. The prediction explanation device 101 may further provide the explanation for the prediction based on the degree of influence score of each of the plurality of relevant portions.

The prediction explanation device 101 may include, but may not be limited to, server, desktop, laptop, notebook, netbook, tablet, smartphone, and mobile phone. In particular, the prediction explanation device 101 may include one or more processors 102, a computer-readable medium (e.g., a memory) 103, and input/output devices 104. The computer-readable storage medium 103 may store instructions that, when executed by the one or more processors 102, cause the one or more processors 102 to provide the explanation for the prediction generated by the ANN model for the given input data, in accordance with aspects of the present disclosure. The computer-readable storage medium 103 may also store various data (e.g., output data, prediction data, prediction score data, ANN model data, input data, input vector data, relevant portion data, portional output data, portional prediction data, portional prediction score data, degree of influence score data, explanation data, influential tokens, etc.) that may be captured, processed, and/or required by the prediction explanation device 101. The prediction explanation device 101 may interact with a user (not shown) via input/output devices 104. The prediction explanation device 101 may interact with the ANN based prediction device 105 over a communication network 107 for sending and receiving various data. The prediction explanation device 101 may also interact with one or more external devices 106 over the communication network 107 for sending or receiving various data. The one or more external devices 106 may include, but are not limited to, a remote server, a digital device, or another computing system.

Figure 2:
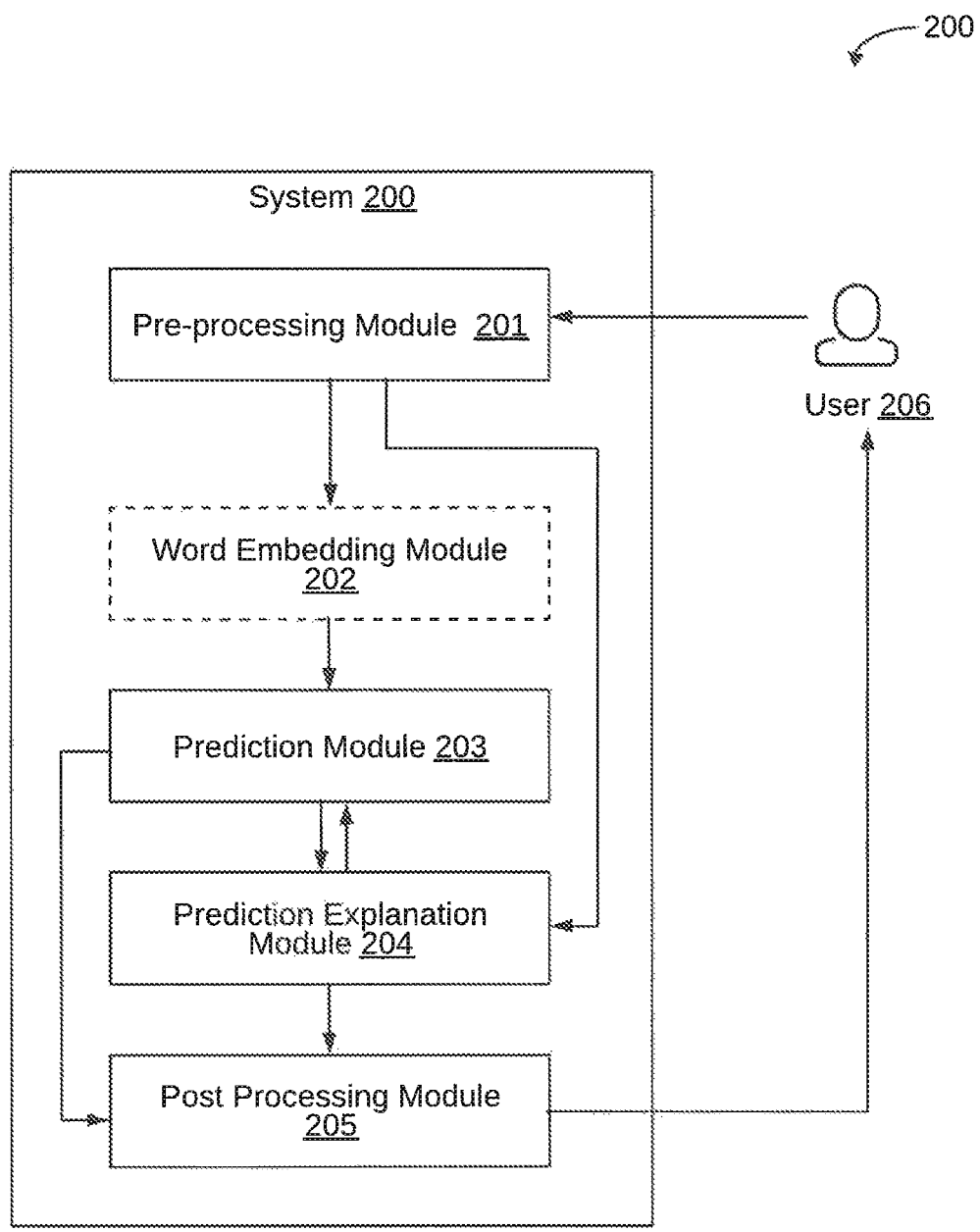
FIG. 2 is a functional block diagram of the exemplary system of FIG. 1, in accordance with some embodiments of the present disclosure.

Referring now to FIG. 2, a functional block diagram of a system 200, analogous to the exemplary system 100 of FIG. 1, is illustrated in accordance with some embodiments of the present disclosure. The system 200 may include various modules that perform various functions so as to provide an explanation for an output (e.g., a prediction) generated by an ANN model for a given input data. In some embodiments, the system 200 may include a preprocessing module 201, an optional word embedding module 202, a prediction module 203, a prediction explanation module 204, and a post processing module 205. In some embodiments, the preprocessing module 201 and the post processing module 205 may interact with a user 206. As will be appreciated by those skilled in the art, all such aforementioned modules 201-205 may be represented as a single module or a combination of different modules. Moreover, as will be appreciated by those skilled in the art, each of the modules may reside, in whole or in parts, on one device or multiple devices in communication with each other.

The preprocessing module 201 may receive input data. In some embodiments, the input data may include text data such as a natural language sentence. In alternate embodiments, the input data may include image data, video data, audio data, etc. The preprocessing module 201 may process the input data so as to prepare the input data. For example, the preprocessing module 201 may segment the natural language sentence into multiple tokens. The preprocessing module 201 may further filter the tokens to remove irrelevant tokens for a particular natural language processing task. By way of an example, the tokens may be filtered to remove punctuations and stop words, which may not assist the ANN model in generating an output but which may add noise to the input. It may be understood that the stop words may include are conjunctions, interjections, etc. Similarly, for example, the preprocessing module 201 may segment the image data into multiple regions and filter-out regions (e.g., white areas, single black pixel, etc.) that may not assist the ANN model in generating an output. As will be appreciated, removal of irrelevant portions is critical for efficient and accurate functioning of the prediction module 203, both during the training and during the testing phase.

In some embodiments, where the input data includes text data, the word embedding module 202 may receive the multiple tokens from the preprocessing module 201, and create vector representations (also referred to as word embeddings) of the tokens. It may be understood that a vector representation may be a representation of a word in a high-dimensional vector space (e.g., 300 dimensions). In some embodiments, the dimensions of the vector representation may be latent, predetermined, and obtained using current knowledge base. The word embedding module 202 may implement a word embedding model to derive the vector representations. Further, the word embedding model may be trained, using an entire raw corpus of text, by computing word embeddings for each word in the entire raw corpus. In other words, the word embedding model may create a mapping of a word in raw text to a vector in the pre-decided vector space. By way of an example, "word2vec" and "GloVe" algorithms may be used for determining the vector representation. As will be appreciated, the vector representation may capture some notion of syntactic and semantic features of a word in a context.

The prediction module 203 may implement the ANN model for generating output (e.g., predictions). The prediction module 203 may receive the vector representation of the prepared input data from the preprocessing module 201. Alternatively, for text based applications, the prediction module 203 may receive the vector representation (i.e., word embeddings) of words or tokens, in the prepared input text, from the word embedding module 202. The prediction module 203 may then generate an output (e.g., a prediction and a prediction score) based on the input vector (e.g., word embeddings). In other words, the prediction module 203 may provide the prediction and the prediction score based on the input data. In some embodiments, the prediction module 203 may be based on a deep learning architecture and, therefore, may not require defined features as input. For example, the prediction module 203 may be capable of automatically understanding and processing textual expressions including textual nuances.

The prediction explanation module 204 may be communicatively coupled to the preprocessing module 201, and may receive the preprocessed input data (e.g., multiple tokens or the prepared input data without noise) from the preprocessing module 201. In some embodiments, the prediction explanation module 204 may further process the preprocessed input data so as to obtain relevant portions of the input data. By way of an example, input data may include preprocessed text data that may be further processed (i.e., segmented, evaluated, and filtered) to obtain the relevant tokens. Additionally, the prediction explanation module 204 may be communicatively coupled to the prediction module 203, and may receive the output (i.e., prediction and prediction score) generated by the prediction module 203 for the given input data. The prediction explanation module 204 may also fetch portional output (i.e., portional prediction and portional prediction score) for each of the relevant portions from the prediction module 203. The prediction explanation module 204 may then provide an explanation for the output (e.g., prediction) of the prediction module 203 by comparing the output (e.g., prediction) for the given input data and portional output (e.g., portional prediction) for each of the relevant portions of the input data. In particular, the prediction explanation module 204 may determine, for each of the relevant portions of the input data, a degree of influence of a given relevant portion on the output (e.g., prediction). In some embodiments, from the relevant portions (e.g., relevant tokens), the prediction explanation module 204 may determine a set of influential portions (e.g., a set of influential tokens) that may have biased the output (e.g., prediction) generated by the prediction module 203 based on their corresponding degree of influence. Additionally, in some embodiments, the prediction explanation module 204 may determine, for each of the relevant portions of the input data, a degree of influence score of a given relevant portion based on the portional prediction score and a comparison between the portional prediction and the prediction. It should be noted that the degree of influence score for a given relevant portion may provide an extent of the degree of influence of the given relevant portion on the output (e.g., prediction).

The post processing module 205 may receive the output (e.g., the prediction) from the prediction module 203 and the raw explanation for the output (e.g., the prediction) from the prediction explanation module 204. The post processing module 205 may then process the output and the raw explanation for the output so as to provide a formatted (i.e., an understandable or a useable) explanation for the output of the prediction module 203. In some embodiments, the post processing module 205 may format the output (e.g., the prediction) and the explanation for the output (e.g., the prediction) into natural language text which is easily understandable for a user. In other words, the post-processing module 205 may help the user in understanding 'how a prediction model is functioning' as well as 'why certain predictions are being made'. As will be appreciated, such insights may be efficiently used to improve the performance of the prediction model. For example, the system 200 may retune the prediction model implemented by the prediction module 203 so as to improve its performance. Further, in some embodiments, the output of the prediction module as well as the explanation for the output may be embedded in the cognitive system or otherwise provided to external system. In such embodiments, the post processing module 205 may translate or format the output and its explanation as per the requirement of the cognitive system or the external system.

It should be noted that all such aforementioned modules 201-205 may be implemented in programmable hardware devices such as programmable gate arrays, programmable array logic, programmable logic devices, or the like. Alternatively, all such aforementioned modules 201-205 may be implemented in software for execution by various types of processors. An identified module of executable code may, for instance, include one or more physical or logical blocks of computer instructions which may, for instance, be organized as an object, procedure, function, or other construct. Nevertheless, the executables of an identified module need not be physically located together, but may include disparate instructions stored in different locations which, when joined logically together, comprise the module and achieve the stated purpose of the module. Indeed, a module of executable code may be a single instruction, or many instructions, and may even be distributed over several different code segments, among different applications, and across several memory devices.

Figure 3:
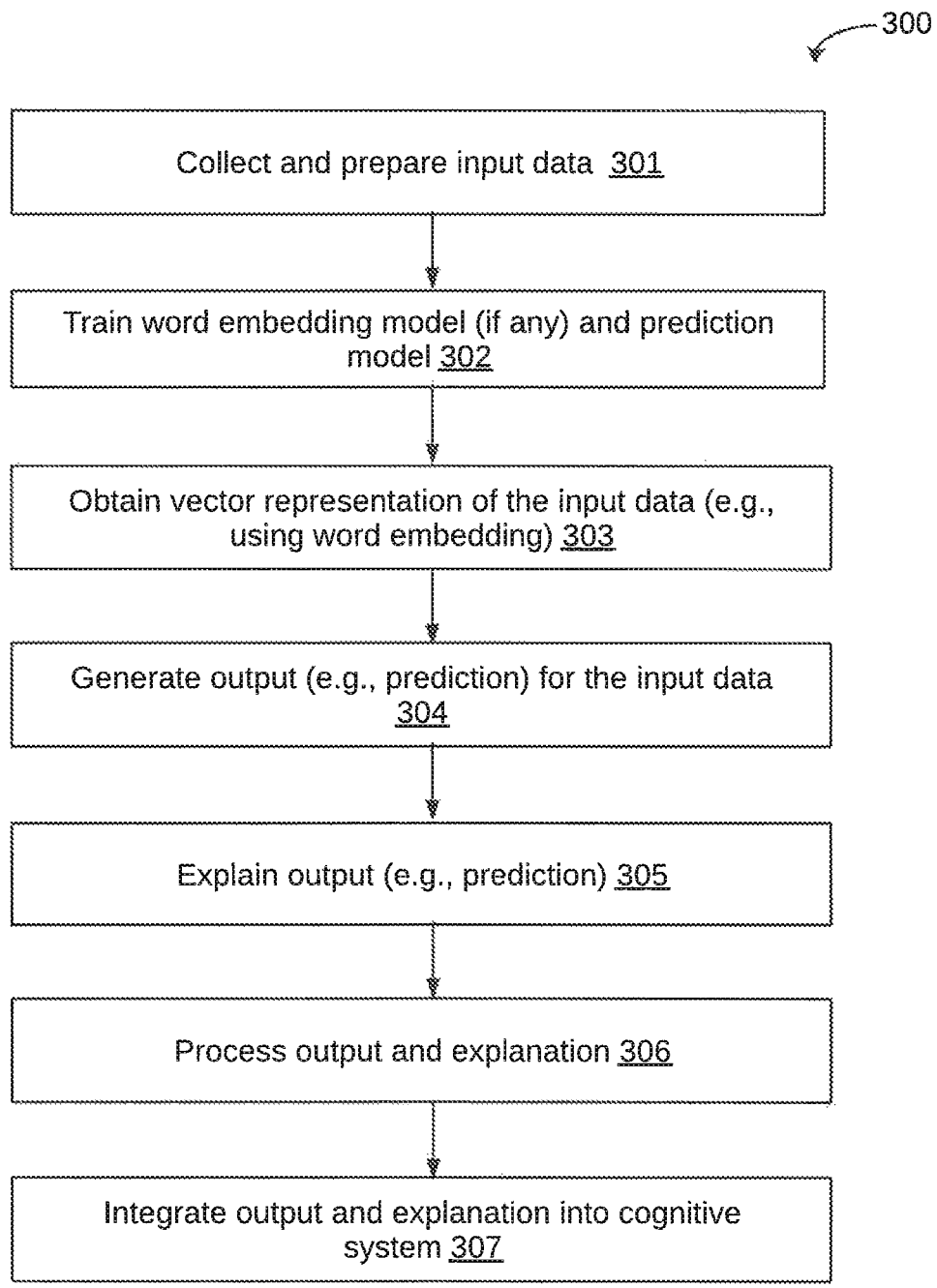
FIG. 3 is a flow diagram of an exemplary process overview for providing an explanation for an output (e.g., a prediction) generated by a prediction model, in accordance with some embodiments of the present disclosure.

Referring now to FIG. 3, an overview of an exemplary process 300 for providing an explanation for an output (e.g., a prediction) generated by an ANN model is depicted via a flowchart, in accordance with some embodiments of the present disclosure. At step 301, input data may be collected and prepared. At step 302, a word embedding model (if any) and a prediction model may be trained. At step 303, vector representation of the input data may be obtained. At step 304, an output (e.g., a prediction) may be generated for the input data. At step 305, the output (e.g., the prediction) may be explained. At step 306, the output and the explanation may be processed. At step 307, the output and the explanation may be integrated into a cognitive system. Each of these steps will be explained in greater detail herein below.

At step 301, input data may be collected and prepared. The input data may include text data (for example, movie reviews, news, blogs, etc.), audio data, video data, image data, etc. By way of an example, the input data includes movie reviews which are to be labeled with an associated sentiment (for example, positive and negative sentiment classification) by the ANN model. It may be understood that the movie reviews may be retrieved from a database, such as Internet Movie Database (IMDB). It may be further understood that the movie reviews may include multiple natural language sentences that may run into hundreds and thousands. As will be appreciated, a large number of movie reviews may allow better forming of word embeddings. As will be further appreciated, for a greater accuracy, the movie reviews may be as varied as possible. This may increase the span and variance of the data, reducing chances of coming across completely unseen pattern instances. It may be noted that the input data may include training data for training a prediction model. The training input data needs to be mined for extracting key ingredients and labelled with required classes, for the prediction model to function as expected. Thus, each review in the training data may be labelled with a particular sentiment, thereby serving as an appropriate dataset for the sentiment analysis task to be performed by the prediction model. Thus, the training input data may include two separate sets of movie reviews with positive sentiment and movie reviews with negative sentiment, and labeled with the positive sentiment and the negative sentiment, respectively. An example of a movie with a positive sentiment review for a movie named "Titanic" is as shown below:

"Titanic is unbeatable and has no match in displaying a profound and passionate love story that is fiery yet innocent, simple yet complex, royal yet crazy, dreamy yet practical. But it's not just a love story, there's more to it, an amazing display of human emotions when confronted by unexpected circumstances, every part of the movie has been best taken care of, from direction, dialogues, acting (Leonardo di Caprio is one of the best actors we have in this millennium, same goes for Kate Winslet), music (My heart will go on by Celine Dion, always in my playlist), set of the movie etc. It's definitely "a must watch before you die" movie. It's a 5 out of 5 movie."

To extract the word embeddings, the raw corpus comprising two sets (the set of movie reviews with positive sentiment and the set of movie reviews with negative sentiment) may be fed into a word embedding trainer so as to train a word embedding model. Thereafter, word embeddings for each word of the raw corpus may be obtained by employing the word embedding model. The varied and large set of data in the raw corpus ensures that the word embeddings are well formed. It may be noted that the word embeddings model may be a shallow ANN that may capture semantic and syntactic essence of the words in a context. Once the data is collected and prepared, the word embedding model and the prediction model are trained, and, consequently, the two models may work together so as to identify sentiments in the input text.

At step 302, a word embedding model (if any) and a prediction model may be trained based on the training data collected, assimilated and prepared at step 301. For example, a deep learning ANN model may be trained based on sentiment labels associated with each movie review, which may be a single sentence, or a set of sentences. Further, as stated above, the word embedding model may be trained using unlabeled input data (i.e., raw corpus) so as to extract latent semantic relationships among words (e.g., in form of vector representation). The training of the prediction model and the word embedding model is further explained in conjunction with FIG. 4.

Figure 4:
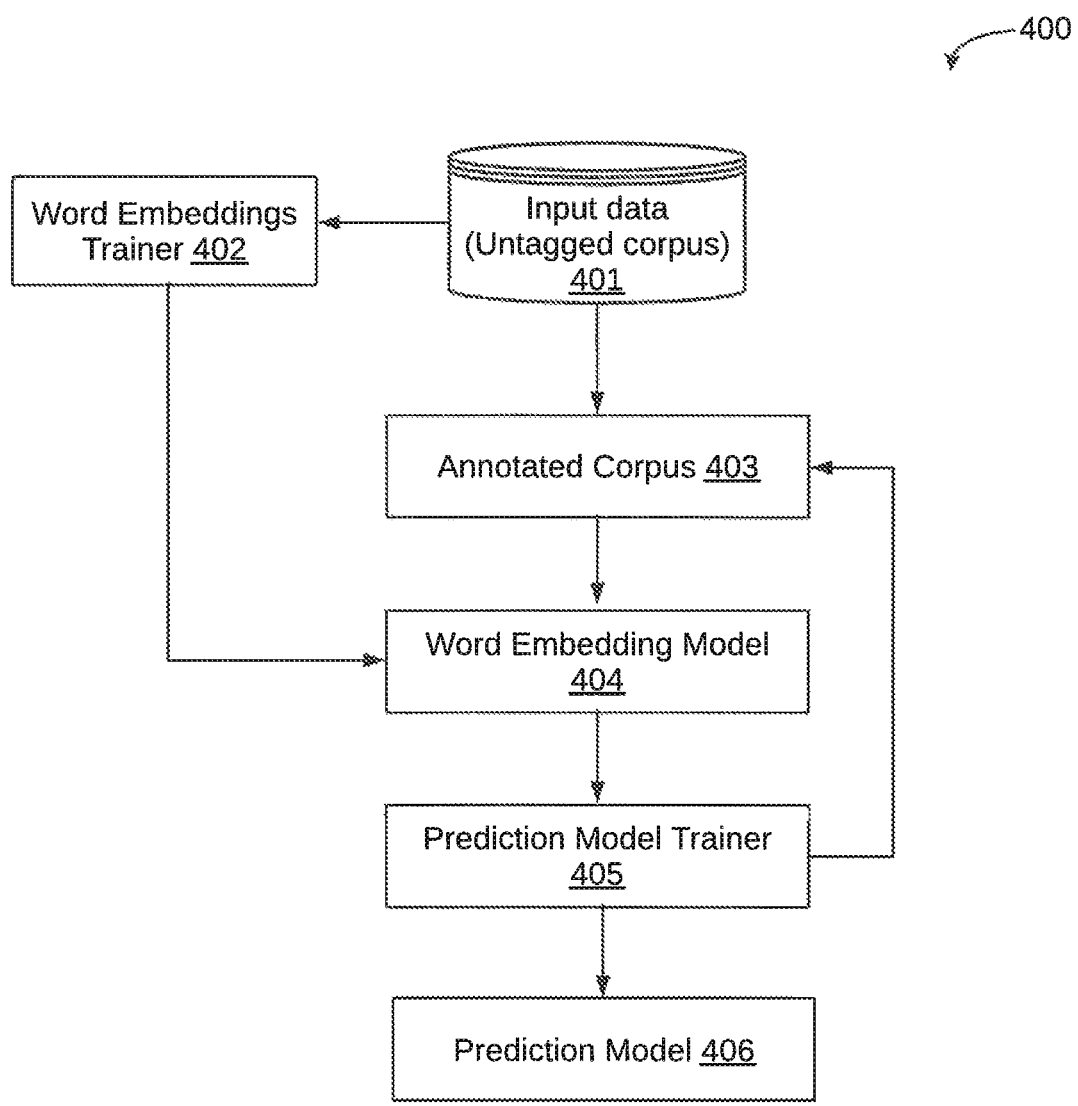
FIG. 4 is a block diagram of a process for training of the prediction model and a word embedding model, in accordance with some embodiments of the present disclosure.

Referring now to FIG. 4, a block diagram of a process 400 for training of the prediction model and the word embedding model is illustrated, in accordance with an embodiment. Input data (untagged or raw corpus) 401 may be received by a word embeddings trainer 402 so as to train the word embedding model 404. Upon exhausting the raw corpus 401, the word embedding model is trained and ready for generating word embeddings for a given word. The untagged corpus 401 may be further tagged (i.e. labelled) to create an annotated corpus 403. The annotated corpus 403 (tagged or labelled data) may then be received by the word embedding model 404 so as to derive word embeddings for each of the words in a set of sentences. The derived word embeddings (i.e., vector representations) may then be received by the prediction model trainer 405 from the word embeddings model 404. Thereafter, the prediction model trainer 405 may train the prediction model 406 based on a list of word embedding vectors. Once the list of word embedding vectors has been trained for, the prediction model trainer 405 may fetch a next set of (labeled) sentences for performing next epoch of training. Upon exhausting the annotated corpus, the prediction model 406 is trained and ready for generating output (e.g., predictions).

Referring back to FIG. 3, at step 303, vector representation for the input data may be obtained. For example, in case of image data, the vector representation of input image data may be directly obtained from input data prepared (i.e., preprocessed input data) at step 301. However, in case of textual data, vector representations (word embeddings) of each word of the input data may be obtained from the word embedding model. As mentioned earlier, the vector representation of a word may represent syntactic and semantic essence of the word, occurring in a context. For example, the word 'happy' may occur in several contexts within the input data, which may be labeled with positive sentiment. It may be understood that vector representation of a new word 'glad' may have similar representations as that of the word 'happy', if the word embedding model encounters the word 'glad', in a similar context. Accordingly, the prediction module may predict the word 'glad' (occurring in a similar context as the word 'happy') to have a positive sentiment. As will be appreciated, even the words that are unseen to the classifier may be handled using this vector representation. As stated above, a word embedding model (e.g., ANN based word embedding model) may be trained to create vector representations of the words. As such, the word, embedding model may receive a word from an unlabeled movie review dataset as an input, and provide context of the word as an output. For example, the context may have a window of size 10 (which is an average sentence size in the movie review). As a word may be represented by the context of words in its vicinity, the words 'happy' and 'glad' may appear in similar contexts and may, therefore, have similar vector representations. The prediction model may, therefore, predict these words correctly.

At step 304, an output (e.g., prediction and prediction score) for the input data may be generated or predicted by the prediction model. As stated above, the prediction model may use ANN model (e.g., a deep learning ANN model) for making the prediction. By way of an example, for a text based input data, a recurrent neural network (RNN) model may be used for predicting the output. Further, for example, for sentiment prediction task, a long short term memory (LSTM) model may be used for predicting the output (i.e., a sentiment associated with the input data). In some embodiments, the output may include a prediction (e.g., positive classification or negative classification) of the input data. In alternate embodiments, the output may include a prediction (e.g., classification) and a prediction score (e.g., a classification score). The parameters and layer-wise architecture of an exemplary ANN model for the sentiment analysis task is further explained in conjunction with FIG. 5.

Figure 5:
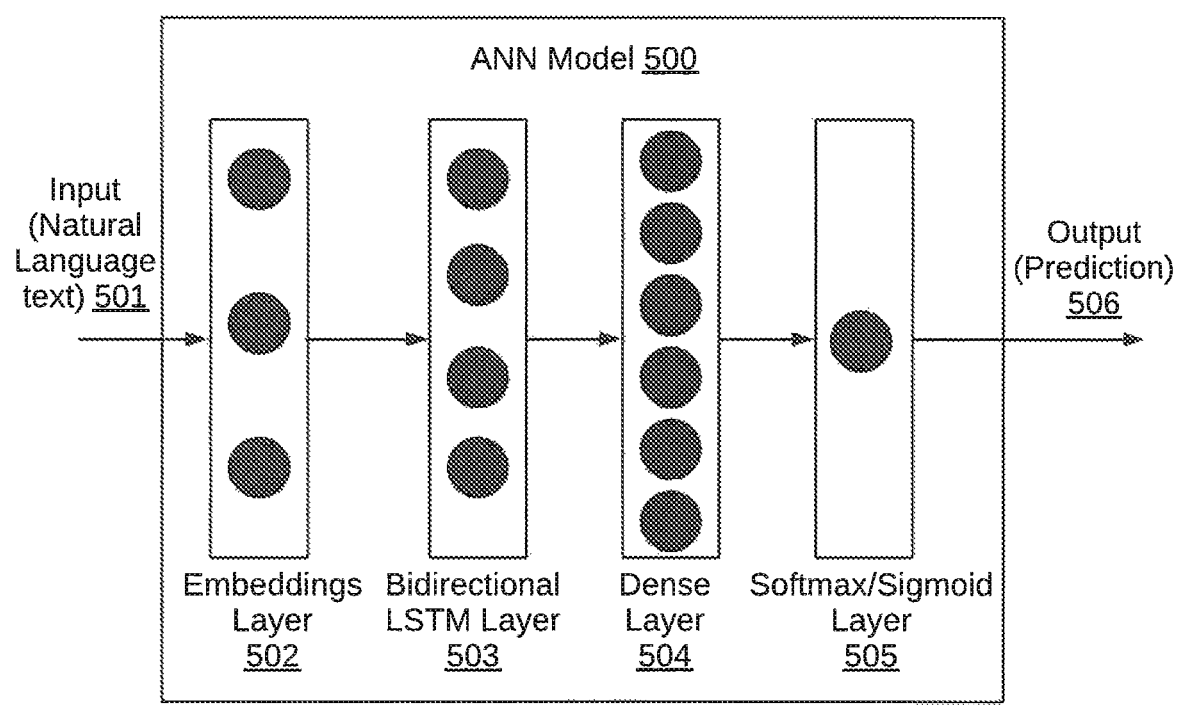
FIG. 5 is layer-wise architecture of an exemplary ANN model for a sentiment analysis task, in accordance with some embodiments of the present disclosure.

Referring now to FIG. 5, a layer-wise architecture of the ANN model 500 for the sentiment analysis task is illustrated, in accordance with some embodiments of the present disclosure. An input 501 may be received by the ANN model 500. In an example, the input 501 may include labeled text in the dataset so as to train the ANN model 500. As will be appreciated, each word in the dataset is indexed, and these word indices may be provided to the ANN model 500. The training input data may be partitioned into a predetermined number of samples. Each partition of these input samples may then be passed on to a next layer (i.e., a word embedding layer) 502 of the ANN model 500. One cycle of training is complete when the ANN model 500 has been trained on the entire dataset (i.e., all the partitions). Once the cycle is over, a next training cycle may begin. The training of the ANN model 500 may be complete once a predetermined number of training cycles (i.e., loops or epochs) is completed.

The word embeddings layer 502 may create word embeddings of the words in the input data 501. As stated above, the words in the input data 501 may be indexed by numbers. In some embodiments, passing each word index may suffice as input into the ANN model 500. However, in alternative embodiments, word embeddings of the words of the input data 501 may be created, so as to take care of unseen words and get an idea of the semantics and context. For example, the ANN model 500 may be aware of the word 'excellent' during training, but may not be aware of the word 'wonderful' as it was not a part of the training sample. However, the vector representation for the word "excellent" may be similar to that of the word "wonderful", as they appear in similar contexts, and have similar sentiment or polarity. It, therefore, may be necessary to concatenate the input vector with the word embeddings.

The embeddings of the input may be fed into the next key layer of the ANN model 500, which is a bidirectional long short term memory (Bidirectional LSTM) layer 503. As will be appreciated, the Bidirectional LSTM is a type of Recurrent Neural Network (RNN). As mentioned earlier, for text based input data, RNN may be selected as it is better suited for sequential type of data, such as textual data. The bidirectional architecture may allow the LSTM layer 503 to scan the input data both backwards and forwards. It will be further appreciated that, in some embodiments, a plain RNN model may be considered as a special case of LSTM. For example, if input gate are fixed all 1's, forget gate are fixed all 0's (i.e., always forget the previous memory), and output gate are fixed all one's (i.e., expose the whole memory), a standard RNN model may be obtained. This RNN model may only contain an additional hyperbolic tangent function (tan h) that may squash the output to some extent. As will be appreciated, the gating mechanism may allow the LSTM layer 503 to model long-term dependencies. By learning parameters for its gates, the LSTM layer 503 may learn how its memory should behave. In a deep neural network, providing word embeddings for words in the input data may be sufficient. However, the sentiment analysis of textual data is one of the complex tasks. Hence, the input vector needs to be more vivid than ones for simpler deep learning architectures. In the illustrated embodiment, extra features has been provided to the ANN model 500. These extra features may include relationships between individual word tokens as well as parts-of-speech as they are relevant and important features. This may help the network to perform more efficiently. Exemplary feed-forward equations of the LSTM may be represented as follows:

$$i = \sigma(x_t U^i + s_{t-1} W^i)$$

$$f = \sigma(x_t U^f + s_{t-1} W^f)$$

$$o = \sigma(x_t U^o + s_{t-1} W^o)$$

$$g = \tan h(x_t U^g + s_{t-1} W^g)$$

$$c_t = (c_{t-1} * f + g * i)$$

$$s_{t-1} = \tan h(c_t) * o$$

where,
i, f and o are input, forget and output gates respectively; all the gates have the same dimensions $d_s$, the size of the hidden state;
U and W are weight matrices;
g is a "candidate" hidden state that is computed based on the current input and the previous hidden state;
$c_t$ is the internal memory of the unit. It is a combination of the previous memory
$c_{t-1}$ multiplied by the forget gate, and the newly computed hidden state g multiplied by the input gate;
$s_t$ is the current hidden state and $s_{t-1}$ is the previous hidden state; and
'*' is element wise multiplication In the illustrated embodiment, loss function may be taken as categorical cross-entropy. Further, Stochastic Gradient Descent may be used for optimizing the loss function with Adaptive Momentum to optimize the gradient descent algorithm.

Next layer of the ANN model 500 is a dense layer 504, which is a fully connected layer. In other words, all the neurons in this layer are connected to all the neurons or activations in the previous layer 503. Once innate features of the input data are captured through the Bidirectional LSTM layer 503, the dense layer 504 may impart high-level understanding in the network, thereby assimilating nuances of textual features captured in the previous layers. Activations from the dense layer 504 may be fed to a final layer (softmax layer or sigmoid layer) 505 of the ANN model 500. The final layer 505 may compute probabilities for each classification. In the current example, the classifications may be 'positive' and 'negative'. The probabilities for each classification may form the output of the ANN model 500. An exemplary formulation of the sigmoid or logistic function (Φ) is as follows:

$$\Phi(x) = 1/(1 + e^{-x})$$

It may be noted that the softmax function (or the normalized exponential function) may be a generalization of the sigmoid function. It may be further noted that the softmax function may transform a k-dimensional vector of artificial values to k-dimensional vector of probability values. The mathematical representation of the softmax function (σ) is as follows:

$$\sigma(x_i) = \frac{e^{x_i}}{\sum_{k=0}^{n} e^{x_k}} \quad (\text{for } i = 1, \ldots, k)$$

The final layer 505 may use one of the softmax function or the logistic function. The final layer 505 may output the probabilities (e.g., prediction score) associated with each classification (e.g., prediction). In the current example, the final layer 505 may provide as output 506, the probabilities associated with the input data belonging to either positive or negative sentiment classifications.

Referring back to FIG. 3, at step 305, the output (e.g., prediction) generated by the prediction model may be explained. For the explanation, the output (e.g., prediction) as well as the input data may be required. Further, the input data may be segmented into a number of portions and processed to filter-out irrelevant portions while retaining relevant portions. Further, for each relevant portions, a portional output (e.g., portional prediction and portional prediction score) may be generated for a given relevant portion by the ANN model. The portional output for the given relevant portion generated by the ANN model may be compared with the overall output (i.e., output for the input data) generated by the ANN model. The comparison may provide a degree of influence of the given portion on the overall output of the ANN model. For example, the text based input data may be split into a number of tokens. The tokens may then be filtered so as to remove irrelevant tokens (token that do not contribute to the output generated), and to obtain relevant tokens. Once the tokens are filtered, the relevant tokens may be evaluated for determining a set of influential tokens that may have biased the generated output (e.g., predictions). For each relevant token, the portional prediction and portional prediction score (i.e., the portional output) may be determined by the ANN model. Further, for each relevant token, a degree of influence score may be determined based on the corresponding portional prediction score and a comparison between the overall prediction and the portional prediction. Thus, the comparison between the portional output of a given relevant token generated by the ANN model and the overall output generated by the ANN model may provide the degree of influence of the given relevant token on the overall output of the ANN model. Thereafter, based on the degree of influence score of each of the relevant tokens, a set of influential tokens may be determined that may have influenced the output (e.g., prediction) generated by the prediction model. The set of influential tokens and their associated degree of influence score may be, therefore, provided as the explanation for the output (e.g., prediction) generated by the prediction model. The generation of explanation for the output generated by the prediction model is further explained in conjunction with FIG. 6.

By way of an example, for an input text "I am so happy and glad that I had tears in my eyes", a prediction obtained from the ANN model may be "Positive". An explanation to the prediction may include relevant tokens and corresponding degree of influence scores, as follows:

Relevant tokens: "happy", "glad", "tears", "eyes"
Degree of influence score: happy—82%, glad—85%, tears—15%, eyes—40%
Influential tokens: happy—82%, glad—85%

Figure 6:
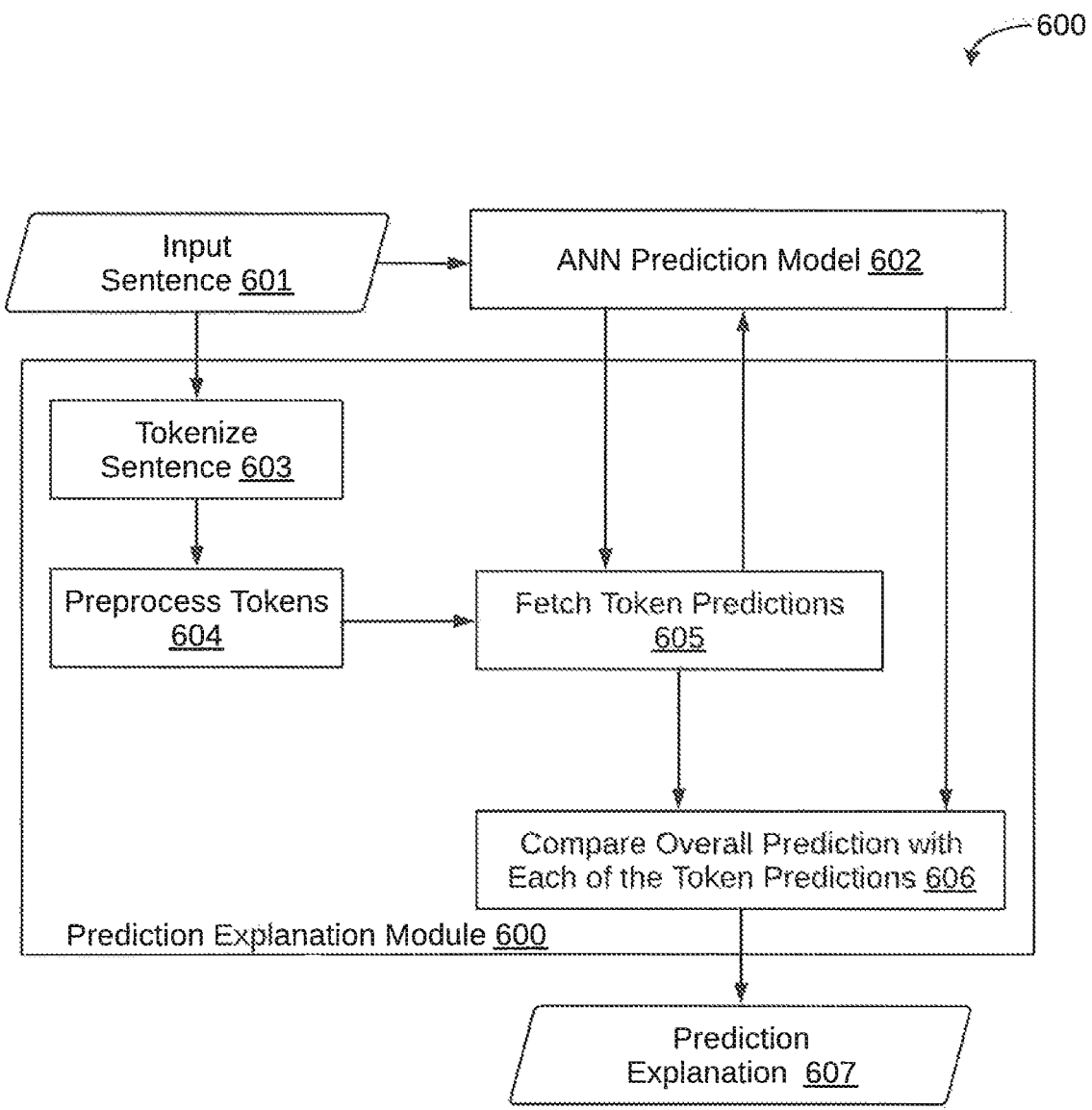
FIG. 6 is a block diagram of a process for providing an explanation for an output (e.g., a prediction) generated by an ANN model, in accordance with some embodiments of the present disclosure.

Referring now to FIG. 6, a block diagram of a process 600 for providing an explanation for an output (e.g., a prediction) generated by an ANN prediction model is illustrated, in accordance with some embodiments of the present disclosure. An input data 601 (e.g., input text such as sentence) may be provided to the ANN prediction model 602. As will be appreciated, the ANN prediction model 602 may generate a prediction and a prediction score as an output for the received input data 601. The input data 601 as well as the output of the ANN prediction model 602 may be further provided to the prediction explanation module 600 (implemented by the prediction explanation device 101). The prediction explanation module 600 may first determine a number of portions of the input data at block 603. For example, the input text (e.g., input sentence) may be segmented or tokenized into multiple tokens (words) at block 603. The prediction explanation module 600 may then determine a plurality of relevant portions of the input data at block 604. It should be noted that relevant portions are portions of the input data that may be contributing to the prediction output. For example, the tokenized sentence may be preprocessed at block 604 so as to filter-out irrelevant tokens (i.e., tokens with no or negligible contribution towards the prediction output) and to obtain relevant tokens. The prediction explanation module 600 may then fetch prediction and prediction score as portional output for each of the relevant portions at block 605. Thus, each of the relevant portions is provided to the ANN prediction model 602, which may then generate a prediction and a prediction score for the received relevant portion (portional output). For example, at block 605, prediction and prediction score for each of the relevant tokens may be fetched from the ANN prediction model 602. As such, each of the relevant tokes may be sent to the ANN prediction model 602, and as a portional output from the ANN prediction model 602, prediction for each of the relevant tokens along with associated prediction score may be received. The prediction explanation module 600 may then compare portional output of each relevant portion with the overall output for the input data at block 606. The comparison may provide a degree of influence of the relevant portion on the output in form of a degree of influence score. For example, the overall output (i.e., prediction and prediction score) for the input sentence 601 may be compared with the portional output (i.e., prediction and prediction score) for each of the relevant tokens at block 606 in order to determine a degree of influence along with a degree of influence score of each of the relevant tokens on the overall output for the input sentence. The prediction explanation module 600 may then provide an explanation 607 for the output (e.g., the prediction for the input data) based on the degree of influence score of each of the relevant portions. For example, the relevant tokens and corresponding degree of influence scores may be provided as the explanation for the overall output for the input sentence. Additionally, in some embodiments, the influential tokens and corresponding degree of influence scores may be provided as the explanation for the overall output for the input sentence.

Referring back to FIG. 3, at step 306, once the output (e.g., prediction) and explanation for the output (e.g., relevant tokens, associated degree of influence scores, influential tokens) is obtained, the combined information may be further processed for rendering to the user or for use by the cognitive system. In particular, the output (e.g., prediction) generated by the prediction model for the input data (e.g., input text) as one of the pre-defined classes, and the relevant/influential portions (e.g., relevant/influential tokens) along with their degree of influence scores may be processed so as to provide an understandable version of the prediction and its explanation. Additionally, in some embodiments, the combined information may be converted in a format that may be understood by the cognitive system or the external devices.

By way of an example, a text based input data may include the sentence: "I am happy and glad", for which the output (e.g., prediction) generated by the prediction module is "positive". As part of the explanation for the output, relevant tokens determined are "happy" and "glad". The portional output (e.g., portional prediction) for "happy" is positive, and "glad" is positive. Further, the portional output (e.g., portional prediction score) for "happy" is 82% and "glad: is 85%. Thus, the degree of influence scores determined for the relevant tokens "happy" is 82%, and "glad" is 85%. This explanation may be processed and converted into an easily understandable format, as follows:

Input Text: "I am happy and glad"
Prediction: Positive
Explanation: 'happy' and 'glad' bias the positive prediction At step 307, the output (e.g., prediction) generated by the prediction model and the explanation for the output (e.g., relevant/influential tokens and the associated degree of influence scores) may be fed into a cognitive system. As discussed earlier, the explanations enable the user or the cognitive system to understand the behavior and functioning of a prediction model. Thus, once the explanation to a prediction is obtained, or the explanations to a set of predictions are obtained, the cognitive system may use these explanations to leverage the performance of the prediction model. Further, an understanding of the behavior of the model by way of these explanations may assist the cognitive system in retuning the prediction model. For example, the understanding of the behavior of the model may help in hyper parameter tuning of the prediction model and to train a better prediction model.

Figure 7:
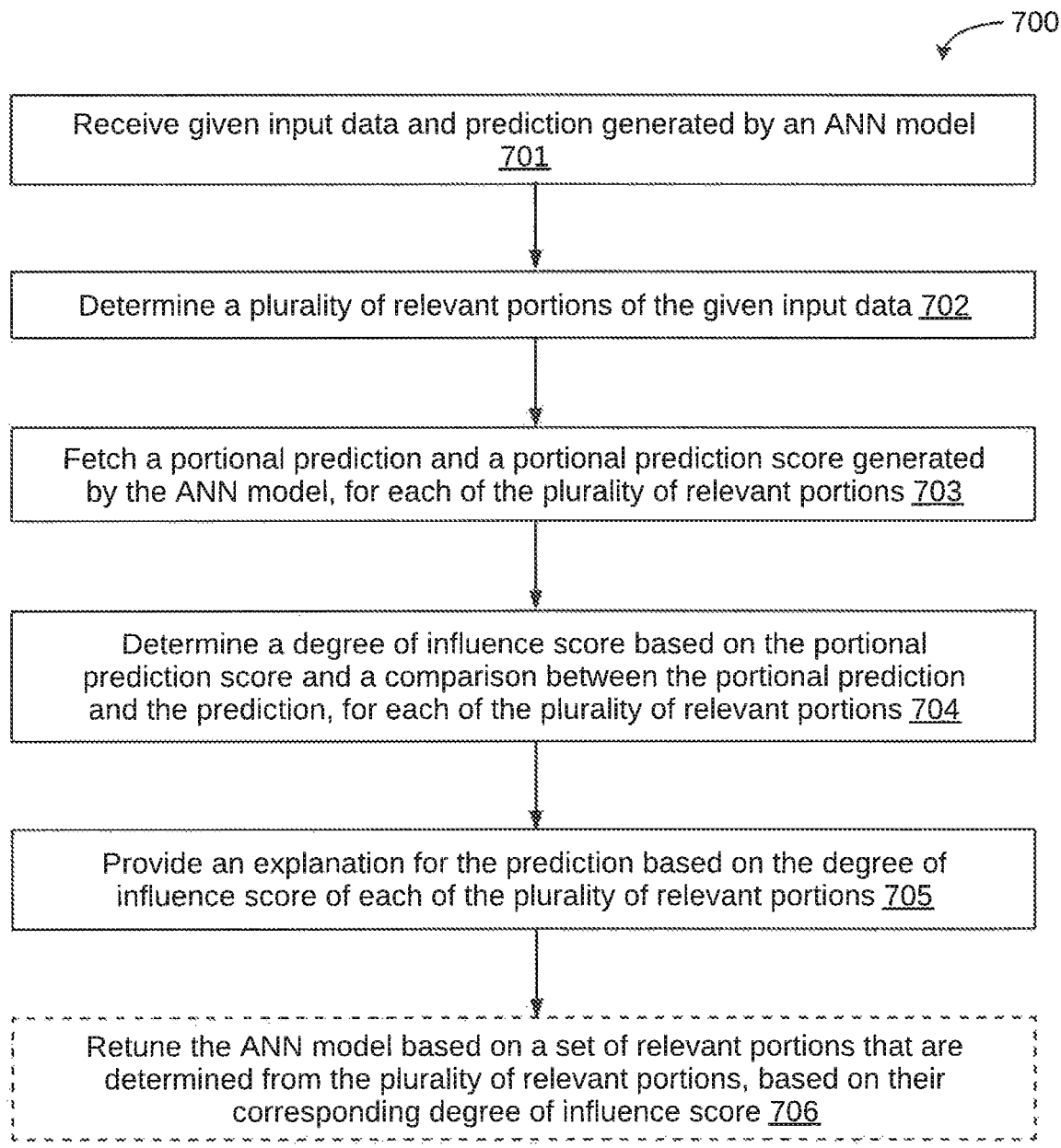
FIG. 7 is a flow diagram of an exemplary process for providing an explanation for an output (e.g., a prediction) generated by an ANN model, in accordance with some embodiments of the present disclosure.

Referring now to FIG. 7, an exemplary process 700 for providing an explanation for an output (e.g., a prediction) generated by an ANN model for a given input data is depicted via a flowchart, in accordance with some embodiments of the present disclosure. At step 701, the prediction explanation device 101 may receive the given input data and the output (e.g., the prediction) generated by the ANN model. At step 702, the prediction explanation device 101 may determine a plurality of relevant portions of the given input data. At step 703, the prediction explanation device 101 may fetch a portional output (e.g., prediction and a portional prediction score) generated by the ANN model for each of the plurality of relevant portions. At step 704, the prediction explanation device 101 may determine a degree of influence score, for each of the plurality of relevant portions, based on a comparison between the portional output and the output. In particular, the prediction explanation device 101 may determine a degree of influence score, for each of the plurality of relevant portions, based on the portional prediction score and a comparison between the portional prediction and the prediction. At step 705, the prediction explanation device 101 may provide the explanation for the output (e.g., prediction) based on the degree of influence score of each of the plurality of relevant portions. Additionally, at step 706, the prediction explanation device 101 may retune the ANN model based on a set of influential portions. The set of influential portions may be determined from the plurality of relevant portions, based on their corresponding degree of influence score.

At step 701, the prediction explanation device 101 may receive the given input data and the output (e.g., prediction) generated by the ANN model. It may be noted that the given input data may include text data, or audio data, or video data, or image data. In some embodiments, the output generated by the ANN model may include a prediction (e.g., a classification). In alternate embodiments, the output generated by the ANN model may include the prediction (e.g., the classification) and a prediction score (e.g., probability score for the classification). It may be further noted that the ANN model may be built and trained for a target application. By way of an example, the target application may include a text based application, such as sentiment analysis. The ANN model may be trained for providing a classification of text data, as an output. For example, the classification of the text data may include a positive or a negative sentiment classification. Further, it may be further noted that the ANN model may be a recurrent neural network (RNN) model.

At step 702, a plurality of relevant portions of the given input data may be determined. In some embodiments, determining the plurality of relevant portions may include segmenting the given input data into a plurality of portions. The determining of the plurality of relevant portions may further include processing each of the plurality of portions to filter the plurality of relevant portions. By way of an example, when the input data includes text data, the text data may be segmented into a plurality of tokens (i.e., words) constituting the text data. The plurality of words may then be filtered to remove irrelevant tokens (for example, the irrelevant words may include punctuations, and stop words like conjunctions, interjections etc.), and obtain relevant tokens.

At step 703, a portional output (e.g., portional prediction and portional prediction score) generated by the ANN model may be fetched, for each of the plurality of relevant portions. In some embodiments, the portional output may include a positive or a negative sentiment classification (i.e., portional prediction) for a given relevant portion (e.g., a given token). Additionally, in some embodiments, the portional output may further include a probability of the positive or the negative sentiment classification (i.e., portional prediction score). At step 704, a degree of influence may be determined. In some embodiments, the degree of influence may be determined based on comparing the portional output (e.g., portional prediction) with the output (e.g., prediction). Additionally, a degree of influence score may be determined based on the portional output (e.g., portional prediction score) and the comparison. By way of an example, the classification (i.e. positive or a negative sentiment classification) and an associated prediction score provided by the ANN model for the input text may be compared with the classification and an associated portional prediction score for each of the relevant token so as to determine a degree of influence and associated degree of influence score for each of the relevant tokens.

At step 705, an explanation for the output (e.g., prediction) may be provided based on the degree of influence score of each of the plurality of relevant portions. In some embodiments, the explanation may include the plurality of relevant portions and the degree of influence score associated with each of the plurality of relevant portions. Alternatively, the explanation may include the set of influential portions that are determined from the plurality of relevant portions, based on their corresponding degree of influence score. By way of an example, for an input data including text data, the explanation may include the relevant/influential tokens (i.e., words), and degree of influence score associated with each of the relevant/influential tokens. In some embodiments, the explanations may be rendered to a user in an easy to understand format (e.g., natural language). Alternatively, the explanations may be provided to the cognitive system in a format understandable by the cognitive system.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 8:
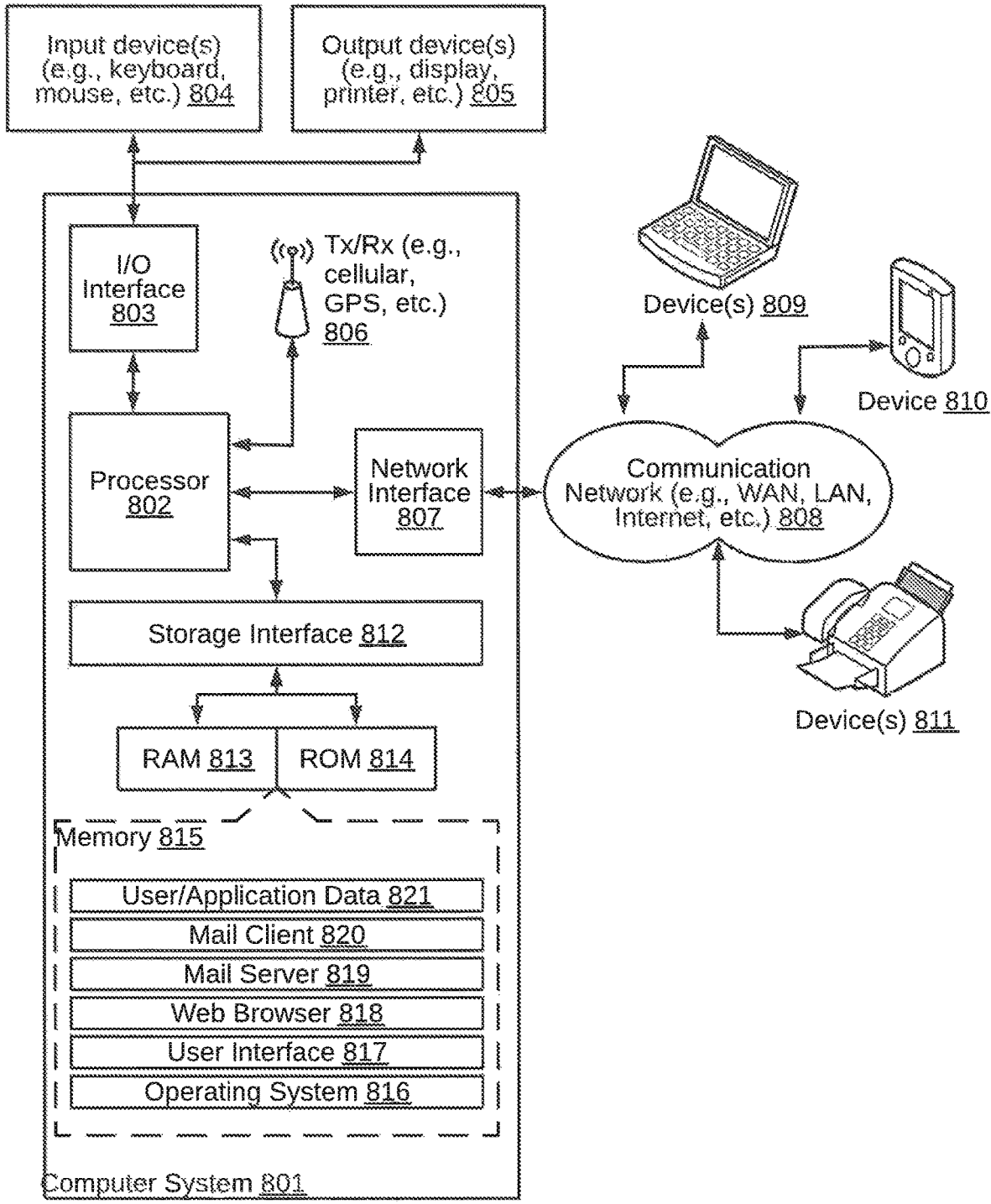
FIG. 8 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 8, a block diagram of an exemplary computer system 801 for implementing embodiments consistent with the present disclosure is illustrated. Variations of computer system 801 may be used for implementing system 100 for providing an explanation for an output (e.g., prediction) generated by an ANN model. Computer system 801 may include a central processing unit ("CPU" or "processor") 802. Processor 802 may include at least one data processor for executing program components for executing user-generated or system-generated requests. A user may include a person, a person using a device such as such as those included in this disclosure, or such a device itself. The processor 802 may include specialized processing units such as integrated system (bus) controllers, memory management control units, floating point units, graphics processing units, digital signal processing units, etc. The processor may include a microprocessor, such as AMD® ATHLON®, DURON® OR OPTERON®, ARM's application, embedded or secure processors, IBM® POWERPC®, INTEL® CORE® processor, ITANIUM® processor, XEON® processor, CELERON® processor or other line of processors, etc. The processor 802 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 802 may be disposed in communication with one or more input/output (I/O) devices via I/O interface 803. The I/O interface 803 may employ communication protocols/methods such as, without limitation, audio, analog, digital, monoaural, RCA, stereo, IEEE-1394, near field communication (NFC), FireWire, Camera Link®, GigE, serial bus, universal serial bus (USB), infrared, PS/2, BNC, coaxial, component, composite, digital visual interface (DVI), high-definition multimedia interface (HDMI), radio frequency (RF) antennas, S-Video, video graphics array (VGA), IEEE 802.n /b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 803, the computer system 801 may communicate with one or more I/O devices. For example, the input device 804 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, altimeter, gyroscope, proximity sensor, or the like), stylus, scanner, storage device, transceiver, video device/source, visors, etc. Output device 805 may be a printer, fax machine, video display (e.g., cathode ray tube (CRT), liquid crystal display (LCD), light-emitting diode (LED), plasma, or the like), audio speaker, etc. In some embodiments, a transceiver 806 may be disposed in connection with the processor 802. The transceiver may facilitate various types of wireless transmission or reception. For example, the transceiver may include an antenna operatively connected to a transceiver chip (e.g., TEXAS INSTRUMENTS® WILINK WL1283®, BROADCOM® BCM4750IUB8®, INFINEON TECHNOLOGIES® X-GOLD 618-PMB9800® transceiver, or the like), providing IEEE 802.11a/b/g/n, Bluetooth, FM, global positioning system (GPS), 2G/3G HSDPA/HSUPA communications, etc.

In some embodiments, the processor 802 may be disposed in communication with a communication network 808 via a network interface 807. The network interface 807 may communicate with the communication network 808. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 808 may include, without limitation, a direct interconnection, local area network (LAN), wide area network (WAN), wireless network (e.g., using Wireless Application Protocol), the Internet, etc. Using the network interface 807 and the communication network 808, the computer system 801 may communicate with devices 809, 810, and 811. These devices may include, without limitation, personal computer(s), server(s), fax machines, printers, scanners, various mobile devices such as cellular telephones, smartphones APPLE® IPHONE®, BLACKBERRY® smartphone, ANDROID® based phones, etc.), tablet computers, eBook readers (AMAZON® KINDLE®, NOOK®, etc.), laptop computers, notebooks, gaming consoles (MICROSOFT® XBOX®, NINTENDO® DS®, SONY® PLAYSTATION®, etc.), or the like. In some embodiments, the computer system 801 may itself embody one or more of these devices.

In some embodiments, the processor 802 may be disposed in communication with one or more memory devices (e.g., RAM 813, ROM 814, etc.) via a storage interface 812. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), STD Bus, RS-232, RS-422, RS-485, I2C, SPI, Microwire, 1-Wire, IEEE 1284, Intel® QuickPathInterconnect, InfiniBand, PCIe, etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 816, user interface application 817, web browser 818, mail server 819, mail client 820, user/application data 821 (e.g., any data variables or data records discussed in this disclosure), etc. The operating system 816 may facilitate resource management and operation of the computer system 801. Examples of operating systems include, without limitation, APPLE® MACINTOSH® OS X, UNIX, Unix-like system distributions (e.g., Berkeley Software Distribution (BSD), FreeBSD, NetBSD, OpenBSD, etc.), Linux distributions (e.g., RED HAT®, UBUNTU®, KUBUNTU®, etc.), IBM® OS/2, MICROSOFT® WINDOWS® (XP®, Vista®/7/8, etc.), APPLE® IOS®, GOOGLE® ANDROID®, BLACKBERRY® OS, or the like. User interface 817 may facilitate display, execution, interaction, manipulation, or operation of program components through textual or graphical facilities. For example, user interfaces may provide computer interaction interface elements on a display system operatively connected to the computer system 801, such as cursors, icons, check boxes, menus, scrollers, windows, widgets, etc. Graphical user interfaces (GUIs) may be employed, including, without limitation, APPLE® MACINTOSH® operating systems' AQUA®, IBM® OS/2®, MICROSOFT® WINDOWS® (e.g., AERO®, METRO®, etc.), UNIX X-WINDOWS, web interface libraries (e.g., ACTIVEX®, JAVA®, JAVASCRIPT®, AJAX®, HTML, ADOBE® FLASH®, etc.), or the like.

In some embodiments, the computer system 801 may implement a web browser 818 stored program component. The web browser may be a hypertext viewing application, such as MICROSOFT® INTERNET EXPLORER®, GOOGLE® CHROME®, MOZILLA® FIREFOX®, APPLE® SAFARI®, etc. Secure web browsing may be provided using HTTPS (secure hypertext transport protocol), secure sockets layer (SSL), Transport Layer Security (TLS), etc. Web browsers may utilize facilities such as AJAX®, DHTML, ADOBE® FLASH®, JAVASCRIPT®, JAVA®, application programming interfaces (APIs), etc. In some embodiments, the computer system 801 may implement a mail server 819 stored program component. The mail server may be an Internet mail server such as MICROSOFT® EXCHANGE®, or the like. The mail server may utilize facilities such as ASP, ActiveX, ANSI C++/C #, MICROSOFT .NET®, CGI scripts, JAVA®, JAVASCRIPT®, PERL®, PHP®, PYTHON®, WebObjects, etc. The mail server may utilize communication protocols such as internet message access protocol (IMAP), messaging application programming interface (MAPI), MICROSOFT® EXCHANGE®, post office protocol (POP), simple mail transfer protocol (SMTP), or the like. In some embodiments, the computer system 801 may implement a mail client 820 stored program component. The mail client may be a mail viewing application, such as APPLE MAIL®, MICROSOFT ENTOURAGE®, MICROSOFT OUTLOOK®, MOZILLA THUNDERBIRD®, etc.

In some embodiments, computer system 801 may store user/application data 821, such as the data, variables, records, etc. (e.g., output data, prediction data, prediction score data, ANN model data, input data, input vector data, relevant portion data, portional output data, portional prediction data, portional prediction score data, degree of influence score data, explanation data, influential tokens, etc.) as described in this disclosure. Such databases may be implemented as fault-tolerant, relational, scalable, secure databases such as ORACLE® OR SYBASE®. Alternatively, such databases may be implemented using standardized data structures, such as an array, hash, linked list, struct, structured text file (e.g., XML), table, or as object-oriented databases (e.g., using OBJECTSTORE®, POET®, ZOPE®, etc.). Such databases may be consolidated or distributed, sometimes among the various computer systems discussed above in this disclosure. It is to be understood that the structure and operation of the any computer or database component may be combined, consolidated, or distributed in any working combination.

As will be appreciated by those skilled in the art, the techniques described in the various embodiments discussed above provide for an explanation for an output (e.g., prediction) generated by an ANN model. The techniques provide for an intelligent system that allows for understanding of a behavior and functioning of a prediction model, such as an ANN model. The techniques are suitable for providing explanation to different types of continuous data, such as text data, audio data, and video data. Besides providing the explanation, these techniques further allow for using the explanation for improving the prediction model. For example, the prediction model may be retuned (hyper parameter tuning) based on the explanation. Further, for a prediction model working with text data, changes may be made in the word distributions in the training text data based on the explanations, to improve the performance of the prediction model. The techniques may further allow for understanding cause of failure of certain predictions, and making corresponding changes. For example, in cases where the prediction system is not performing as per expectation, or there is a confusion regarding which hyper parameters to use, the current techniques will allow for better understanding of the prediction model. As will be appreciated, the current techniques allow for overcoming the black box nature of an artificial neural network (ANN) model to provide insights into the reasoning adopted by the ANN in generating the output (e.g., prediction).

The specification has described method and system for providing an explanation for an output (e.g., prediction) generated by an ANN model. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of providing an explanation for a prediction generated by an artificial neural network (ANN) model for a given input data, the method comprising:
    receiving, by a prediction explanation device, the given input data and the prediction generated by the ANN model, wherein the ANN model is built and trained for a target application;
    determining, by the prediction explanation device, a plurality of relevant portions of the given input data;
    for each of the plurality of relevant portions,
        fetching, by the prediction explanation device, a portional prediction and a portional prediction score generated by the ANN model; and
        determining, by the prediction explanation device, a degree of influence score based on the portional prediction score and a comparison between the portional prediction and the prediction; and
    providing, by the prediction explanation device, the explanation for the prediction based on the degree of influence score of each of the plurality of relevant portions.

2. The method of claim 1, wherein the given input data comprises at least one of text data, audio data, video data, and image data.

3. The method of claim 1, wherein determining the plurality of relevant portions comprises:
    segmenting the given input data into a plurality of portions; and
    processing each of the plurality of portions to filter the plurality of relevant portions.

4. The method of claim 1, wherein the target application comprises a text based application, wherein the ANN model comprises a recurrent neural network (RNN) model, and wherein each of the plurality of relevant portions comprises a relevant token from a tokenized text.

5. The method of claim 1, wherein the providing the explanations further comprises determining a set of influential portions from among the plurality of relevant portions based on the degree of influence score of each of the plurality of relevant portions.

6. The method of claim 5, further comprising retuning the ANN model based on the set of influential portions.

7. The method of claim 1, wherein the providing the explanations comprises rendering each of the plurality of relevant portions along with the corresponding degree of influence score.

8. A system for providing an explanation for a prediction generated by an artificial neural network (ANN) model for a given input data, the system comprising:
    a prediction explanation device comprising at least one processor and a computer-readable medium storing instructions that, when executed by the at least one processor, cause the at least one processor to perform operations comprising:
        receiving the given input data and the prediction generated by the ANN model, wherein the ANN model is built and trained for a target application;
        determining a plurality of relevant portions of the given input data;
        for each of the plurality of relevant portions,
            fetching a portional prediction and a portional prediction score generated by the ANN model; and
            determining a degree of influence score based on the portional prediction score and a comparison between the portional prediction and the prediction; and
        providing the explanation for the prediction based on the degree of influence score of each of the plurality of relevant portions.

9. The system of claim 8, wherein the given input data comprises at least one of text data, audio data, video data, and image data.

10. The system of claim 8, wherein determining the plurality of relevant portions comprises:
    segmenting the given input data into a plurality of portions; and
    processing each of the plurality of portions to filter the plurality of relevant portions.

11. The system of claim 8, wherein the target application comprises a text based application, wherein the ANN model comprises a recurrent neural network (RNN) model, and wherein each of the plurality of relevant portions comprises a relevant token from a tokenized text.

12. The system of claim 8, wherein the providing the explanations further comprises determining a set of influential portions from among the plurality of relevant portions based on the degree of influence score of each of the plurality of relevant portions.

13. The system of claim 12, wherein the operations further comprise retuning the ANN model based on the set of influential portions.

14. The system of claim 8, wherein the providing the explanations comprises rendering each of the plurality of relevant portions along with the corresponding degree of influence score.

15. A non-transitory computer-readable medium storing computer-executable instructions that, when executed by at least one processor, cause the at least one processor to perform operations comprising:
    receiving a given input data and a prediction generated by an artificial neural network (ANN) model for the given input data, wherein the ANN model is built and trained for a target application;
    determining a plurality of relevant portions of the given input data;
    for each of the plurality of relevant portions,
        fetching a portional prediction and a portional prediction score generated by the ANN model; and
        determining a degree of influence score based on the portional prediction score and a comparison between the portional prediction and the prediction; and
    providing an explanation for the prediction based on the degree of influence score of each of the plurality of relevant portions.

16. The non-transitory computer-readable medium of the claim 15, wherein the target application comprises a text based application, wherein the ANN model comprises a recurrent neural network (RNN) model, and wherein each of the plurality of relevant portions comprises a relevant token from a tokenized text.

17. The non-transitory computer-readable medium of the claim 15, wherein determining the plurality of relevant portions comprises:
- segmenting the given input data into a plurality of portions; and
- processing each of the plurality of portions to filter the plurality of relevant portions.

18. The non-transitory computer-readable medium of the claim 15, wherein the providing the explanations further comprises determining a set of influential portions from among the plurality of relevant portions based on the degree of influence score of each of the plurality of relevant portions.

19. The non-transitory computer-readable medium of the claim 18, wherein the operations further comprise retuning the ANN model based on the set of influential portions.

20. The non-transitory computer-readable medium of the claim 15, wherein the providing the explanations comprises rendering each of the plurality of relevant portions along with the corresponding degree of influence score.

* * * * *